United States Patent [19]

Kanemasa

[11] Patent Number: 4,605,826
[45] Date of Patent: Aug. 12, 1986

[54] ECHO CANCELER WITH CASCADED FILTER STRUCTURE

[75] Inventor: Akira Kanemasa, Tokyo, Japan
[73] Assignee: NEC Corporation, Tokyo, Japan
[21] Appl. No.: 506,306
[22] Filed: Jun. 21, 1983

[30] Foreign Application Priority Data

Jun. 23, 1982 [JP] Japan .............................. 57-107821
May 17, 1983 [JP] Japan ................................ 58-86181

[51] Int. Cl.$^4$ ............................................. H04B 3/20
[52] U.S. Cl. ................................................. 179/170.2
[58] Field of Search ............... 179/170.2, 170.6, 170.8; 333/166; 364/724

[56] References Cited

U.S. PATENT DOCUMENTS

| | | | |
|---|---|---|---|
| 3,647,992 | 3/1972 | Thomas | 179/170.2 |
| 4,377,793 | 3/1983 | Horna | 333/165 |
| 4,464,746 | 8/1984 | Snijders et al. | 179/170.2 |

FOREIGN PATENT DOCUMENTS

| | | | |
|---|---|---|---|
| 0034241 | 8/1981 | European Pat. Off. | 333/166 |
| 0044598 | 1/1982 | European Pat. Off. | 179/170.2 |
| 8301715 | 5/1983 | World Int. Prop. O. | 179/170.2 |
| 2109208 | 5/1983 | United Kingdom | 179/170.2 |

OTHER PUBLICATIONS

IEEE Standard Dictionary of Electrical and Electronics Terms, Second Edition, The Institute of Electrical and Electronics Engineers, New York, N.Y., May 12, 1978, pp. 798, 815, 868.
"Digital Echo Cancellation for Baseband Data Transmission", IEEE Transactions on Acoustics, Speech and Signal Processing, vol. ASSP-27, No. 6, pp. 768–781, Dec. 1979.
"A New Digital Echo Canceler for Two-Wave Subscriber Lines", IEEE Transactions on Communications, vol. COM-29, No. 11, pp. 1573–1581, Nov. 1981.

Primary Examiner—Gene Z. Rubinson
Assistant Examiner—R. Vaas
Attorney, Agent, or Firm—Charles E. Pfund

[57] ABSTRACT

An echo canceler performs convergence in a multiple step manner using a plurality of adaptive digital filters. The adaptive digital filters are sequentially operated to supply data to the corresponding D/A converters such that the echo signals are sequentially cancelled in a stepwise manner. Random access memories are used to allow a decrease in the required number of bits and thus the dimensions of the memories, hence in the overall circuit, so that a compact LSI echo canceler can be easily obtained.

7 Claims, 15 Drawing Figures

ECHO CANCELER WITH CASCADED FILTER STRUCTURE

BACKGROUND OF THE INVENTION

I. Field of the Invention

The present invention relates to an improvement of an echo canceler for eliminating an echo caused by an impedance mismatch in two-wire/four-wire conversion.

II. Description of the Prior Art

Active and extensive studies have been made for a variety of practical applications so as to provide an integrated services digital network (ISDN), thereby achieving a multipurpose digital network (for telephone and nontelephone communications), at low cost. For example, the development of two-wire bidirectional digital transmission using a subscriber's cable for transmitting an analog speech signal is one of the objectives in providing such an ISDN system.

An echo canceler is known as a means for realizing two-wire bidirectional digital transmission. For example, a conventional echo canceler is described in "Digital Echo Cancellation for Baseband Data Transmission", IEEE Transactions on Acoustics, Speech and Signal Processing Vol. ASSP-27, No. 6, PP 768-781, December 1979. A D/A (digital to analog) converter (DAC) of the conventional echo canceler of this type generally converts 12-bit data. In order to obtain an LSI (large scale integration) echo canceler, the number of bits of the D/A converter is preferably small.

Another conventional echo canceler with a single memory is described in "A New Digital Echo Canceler for Two-Wire Subscriber Lines", IEEE Transactions on Communications, Vol. COM-29, No. 11, pp 1573-1581, November 1981.

Figure 1:
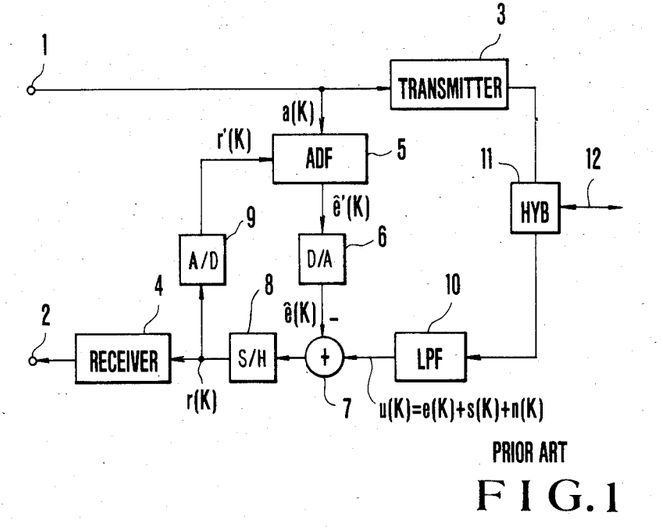
FIG. 1 is a block diagram of a conventional echo canceler.

FIG. 1 is a block daigram of a conventional echo canceler. Referring to FIG. 1, reference numerals 1 and 2 denote input and output terminals, respectively; 3, a transmitter; 4, a receiver; 5, an adaptive digital filter (ADF); 6, a D/A converter (DAC); 7, a subtractor; 8, a sample-and-hold circuit (SH); 9, an A/D converter (ADC); 10, a low-pass filter (LPF); 11, a hybrid circuit (HYB); and 12, a two-wire transmission line. The circuit shown in FIG. 1 is connected to another echo canceler through the two-wire transmission line. If the two-wire line is regarded as a subscriber cable, one echo canceler is located at the subscriber station, whereas the other echo canceler is located at the local switching center. For the sake of simplicity, assume that baseband transmission is performed, and that the echo canceler shown is located at the subscriber station.

A transmitted signal from the subscriber terminal is supplied to the transmitter 3 and the adaptive digital filter 5 through the input terminal 1. The transmitted signal has been scrambled to eliminate correlation with a received signal. The transmitter 3 serves as an interface circuit between the subscriber terminal and the two-wire transmission line 12. The transmitter 3 comprises a unipolar/bipolar converter, a band limit filter, a buffer amplifier and the like, as needed. An outut signal from the transmitter 3 is transmitted onto the two-wire transmission line 12 through the hybrid circuit 11, and is simultaneously supplied as an echo (caused by malfunction of the hybrid circuit 11 or an impedance mismatch) to the low-pass filter 10.

A received signal which is transmitted from the local switching center is also supplied to the low-pass filter 10 through the two-wire transmission line 12 and the hybrid circuit 11. If the echo signal, the received signal, and additive noise of the received signal which occurs on the two-wire transmission line 12 are given as $e(k)$ (where k is the time index), $s(k)$ and $n(k)$, respectively, an output signal $u(k)$ from the low-pass filter 10 is given as follows:

$$u(k) = e(k) + s(k) + n(k) \tag{1}$$

The principle of echo cancellation is to produce an echo replica (echo estimate) $\hat{e}(k)$ of the echo signal $e(k)$ to cancel the echo signal. Referring to FIG. 1, the echo replica $\hat{e}(k)$ can be produced using a closed loop which comprises the adaptive digital filter 5, the D/A converter 6, the subtractor 7, the sample-and-hold circuit 8 and the A/D converter 9. Therefore, an echo-cancelled (sampled) signal $r(k)$ can be obtained as the output signal from the sample-and-hold circuit 8 as follows:

$$r(k) = \hat{e}(k) - e(k) + s(k) + n(k) \tag{2}$$

where the echo replica $\hat{e}(k)$ is the output signal from the D/A converter 6 and is supplied to the subtractor 7. In equation (2), a term $\{e(k) - \hat{e}(k)\}$ is called a residual echo. The receiver 4 comprises a bipolar/unipolar converter, a Nyquist filter, a line equalizer, a buffer amplifier and the like, as needed.

Figure 2:
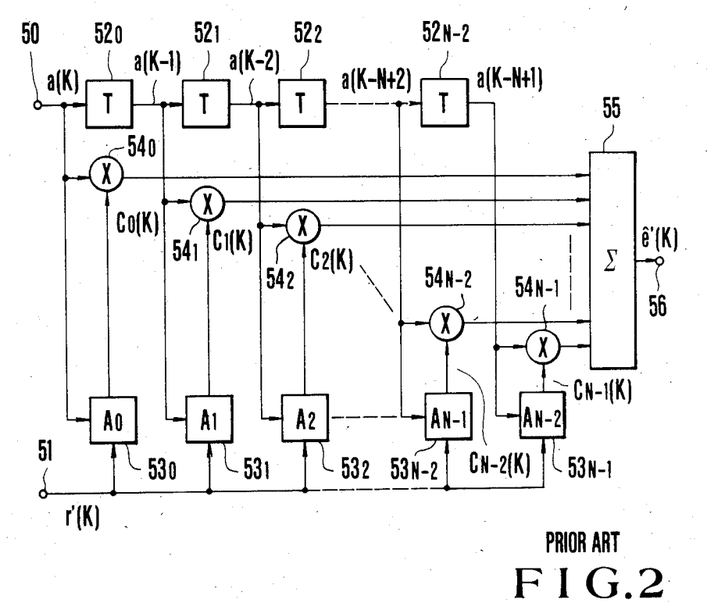
FIG. 2 is a detailed block diagram of an adaptive digital filter shown in FIG. 1.

FIG. 2 is a detailed block diagram of the adaptive digital filter 5 shown in FIG. 1. Reference numerals 50 and 51 denote input terminals; $52_0, 52_1, \ldots,$ and $52_{N-2}$, delay elements; $53_0, 53_1, \ldots,$ and $53_{N-1}$, coefficient generators; $54_0, 54_1, \ldots,$ and $54_{N-1}$, multipliers; 55, an adder; and 56, an output terminal. Referring to FIG. 2, an input signal $a(k)$ supplied to the input terminal 50, an input error signal $r'(k)$ supplied to the input terminal 51, and an output signal $\hat{e}'(k)$ appearing at the output terminal 56 correspond to the input and output signals $a(k)$, $r'(k)$ and $\hat{e}'(k)$ of the adaptive digital filter 5 shown in FIG. 1, respectively. The input signal $a(k)$ is simultaneously supplied from the input terminal 50 to the delay element $52_0$, the multiplier $54_0$ and the coefficient generator $53_0$. The delay elements $52_0, 52_1, \ldots,$ and $52_{N-2}$ are connected in series with each other in the order named. The connecting points between adjacent delay elements are illustrated in FIG. 2 as $a(k), a(k-1)$ etc. An output signal $a(k-n+1)$ is simultaneously supplied from the delay element $52_m$ to the delay element $52_{m+1}$, the multiplier $54_{m+1}$, and the coefficient generator $53_{m+1}$ (where m is a natural number). The input error signal $r'(k)$ is simultaneously supplied from the input terminal 51 to the coefficient generators $53_0, 53_1, \ldots,$ and $53_{N-1}$. The coefficient generator $53_m$ receives the input signal $r'(k)$ and the signal $a(k-m)$ and supplies a coefficient signal $C_m(k)$ to the multiplier $54_m$. The N output signals from the N multipliers $54_0, 54_1, \ldots,$ and $54_{N-1}$ are added together by the adder 55. The adder 55 produces the signal $\hat{e}'(k)$ which then appears at the output terminal 56. In this manner, the echo replica $\hat{e}'(k)$ can be produced on the basis of the value of the error signal $r'(k)$. The delay time of each of the delay elements $52_0, 52_1, \ldots,$ and $52_{N-2}$ is the same as the data transmission rate (T seconds). In practice, the delay elements may comprise flip-flops. The coefficient generator $A_m$ updates the coefficient data such that the error signal $r'(k)$ is minimized in accordance with an adaptive algorithm such as linear LMS (least mean square) algorithms. The circuit arrangement shown in FIG. 2 fundamentally corresponds to that of a transversal filter. When the coefficients converge, they respectively correspond to signals obtained by approximation of the impulse response of an echo path constituting the transmitter, the hybrid circuit 11, and the low-pass filter 10.

The problems of the echo canceler shown in FIG. 1 will be descibed. If a nonlinear circuit element is present in the closed loop which comprises the adaptive digital filter 5, the D/A converter 6, the subtractor 7, the sample-and-hold circuit 8 and the A/D converter 9, the coefficients tend not to converge, and the level of the residual echo signal $\{e(k)-\hat{e}(k)\}$ is increased, thus increasing the noise component. In particular, the nonlinearity of the D/A converter 6 greatly degrades the signal-to-noise ratio. The possible nonlinear components from the D/A converter 6 may be classified into a quantizing noise component and a noise component inherent to the converter. The quantizing noise component can be neglected by sufficiently increasing the number of bits of the D/A converter. However, the inherent noise component can be only slightly reduced by circuit control and, even so, this results in a time-consuming manufacturing process and high cost. More particularly, in order to control the converter, fine adjustment by laser trimming must be performed. Alternatively, a nonlinearity compensation circuit must be arranged, resulting in high cost and large-scale construction.

Further, since the echo canceler is applied to a subscriber access system in a communication network, the D/A converter is required to have 12-input bit number as described above in consideration of line loss. However the circuit scale of the converter increases exponentially with the input bit number thereof, and from this point of view input bit number of the D/A converter must be small.

SUMMARY OF THE INVENTION

It is, therefore, an object of the present invention to provide an echo canceler wherein nonlinear characteristics of a D/A converter may not affect the performance thereof.

It is another object of the present invention to provide an echo canceler wherein the D/A converter need not be finely adjusted.

It is still another object of the present invention to provide an echo canceler which has small hardware suitable for an LSI.

It is still another object of the present invention to provide an echo canceler wherein the D/A converter thereof has the required small bit conversion capacity.

According to an aspect of the present invention, there is provided an echo canceler, comprising:

transmitting means for receiving a transmitted binary data sequence having a predetermined interval, converting the transmitted binary data sequence to a given coded signal, and producing the given coded signal;

an adaptive digital filter including a plurality of delay elements for receiving the transmitted binary data sequence, delaying the transmitted binary data sequence by one sampling interval so as to obtain a delayed data sequence, and dividing the delayed data sequence into a plurality of groups of signal components, the groups of signal components being produced as address signals, respectively, a plurality of memories respectively having memory cells storage contents therein which are read out in response to the address signals from said delay elements, the number of said memories being equal to that of the plurality of groups of signal components;

A plurality of D/A converters for converting readout digital signals from said plurality of memories to analog signals, respectively;

an analog adder for adding all the analog signals from said plurality of D/A converters to produce an echo replica;

a hybrid circuit for receiving the given coded signal from said transmitting means, a received signal from a two-wire transmission line, and an additive noise included in the received signal during transmission on the two-wire transmission line, the given coded signal being produced as an echo signal;

a low-pass filter for receiving the echo signal, the received signal and the additive noise and for eliminating a high frequency component therefrom;

a subtractor for receiving a filtered signal from said low-pass filter and the echo replica from said analog adder and for subtracting the echo replica from the filtered signal so as to produce an error signal;

a sample-and-hold circuit for receiving the error signal and for producing a sampled signal;

an A/D converter for receiving the sampled signal from said sample-to-hold circuit and for producing a digital signal and receiving means for receiving and decoding the sampled signal and for sending a decoded signal therefrom, said adaptive digital filter further including a plurality of 2-input adders, each of which receives a signal from said A/D converter and one of the readout digital signals from said plurality of memories, the number of said 2-input adders being equal to that of said memories, and sum signals from said 2-input adders being stored in said memories, respectively.

According to another aspect of the present invention, there is also provided an echo canceler comprising:

a plurality of adaptive digital filters, each of which comprises a plurality of delay elements for receiving a transmitted binary data sequence having a predetermined interval, delaying the transmitted binary data sequence by one sampling interval so as to obtain a delayed data sequence, and dividing the delayed data sequence into a plurality of groups of signal components, the groups of signal components being produced as address signals, respectively, a plurality of memories respectively having memory cells storage contents therein which are read out in response to the address signals, the number of said memories being equal to that of the plurality of groups of signal components, a scaling circuit for performing predetermined scaling, and a plurality of 2-input adders, each of which receives a scaled signal from said scaling circuit and one of the readout digital signals from said plurality of memories, the number of said 2-input adders being equal to that of said memories, and sum signals from said 2-input adders being stored in said memories, respectively;

a plurality of switching means respectively connected to said plurality of adaptive digital filters so as to sequentially cause said plurality of adaptive digital filters to perform convergence operation;

a timing generator for supplying a control signal to said plurality of switching means, so that a first adaptive digital filter among said plurality of adaptive digital filters partially cancels the echo, and an ith (i=2, 3, . . . ) adaptive digital filter cancels a residual echo which is left uncanceled by the first to (i−1)th adaptive digital filters; and a plurality of D/A converters respectively corresponding to said memories so as to sequentially receive and convert the readout digital signals to analog signals.

BRIEF DESCRIPTION OF THE DRAWINGS

FIGS. 6(a) to 6(e) are timing charts of signals at main parts of the transmitter shown in FIG. 5;

DETAILED DESCRIPTION OF THE PREFERRED EMBODIMENTS

Figure 3:
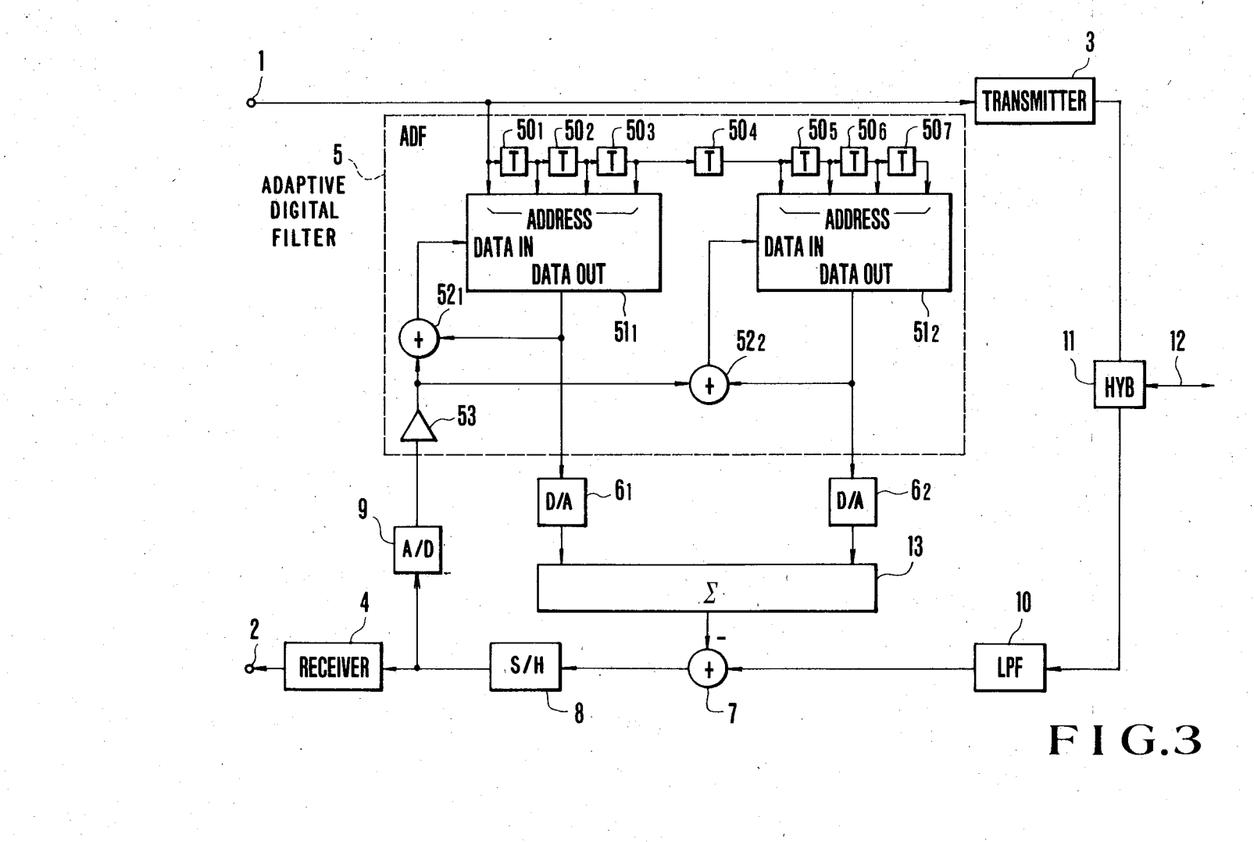
FIG. 3 is a block diagram of an echo canceler according to a first embodiment of the present invention.

FIG. 3 is a block diagram of an echo canceler according to a first embodiment of the present invention. Reference numerals 1 and 2 denote input and output terminals, respectively; 3, a transmitter; 4, a receiver; 5, an adaptive digital filter; $50_1$, $50_2$, . . . and $50_7$, delay elements each of which has a delay time of T seconds; $51_1$ and $51_2$, random access memories; $6_1$ and $6_2$, D/A converters (DAC); 13, an analog adder; 7, a subtractor; 8, a sample-and-hold circuit (SH); 9, an A/D converter (ADC); $52_1$ and $52_2$, adders; 10, a low-pass filter (LPF); 11, a hybrid circuit (HYB); 12, a two-wire transmission line; and 53, a scaling circuit.

For the sake of simplicity, the adaptive digital filter 5 in FIG. 3 has eight taps. The eight taps are then divided into two groups. As will be apparent from the following description, the number of taps and the number of groups are not limited to eight and two, respectively. For further illustrative convenience, a description will be made for a case wherein binary data "0" is coded to +1, and binary data "1" is coded to "−1". Other codes such as bipolar and biphase codes will be described later. The operating rate of the digital signal processing section is regarded as being the same as the data transmission rate. A case will be described later when the operating rate differs from the data transmission rate.

The operation of the echo canceler according to the first embodiment of the present invention will now be described with reference to FIG. 3.

Referring to FIG. 3, a binary data sequence comprising binary numbers "0" and/or "1" is supplied to the input terminal 1. The binary data sequence is then supplied as an input signal to the transmitter 3 and the delay element $50_1$. The transmitter 3 comprises an encoder which encodes the input signal to a code which is constituted by a combination of +1 (corresponding to the binary data "0") and/or −1 (corresponding to the binary data "1"). The encoded signal is transmitted onto the two-wire transmission line 12 through the hybrid circuit 11. The interval between the binary data sequences supplied to the input terminal 1 is T seconds. This interval corresponds to the delay time of each of the delay elements $50_1$, $50_2$, . . . , and $50_7$ which delay the transmitted binary data sequence by one sampling interval so as to obtain delayed data sequences. Each delay element may comprise a flip-flop which is operated by a clock having a period T seconds. The data sequence supplied to the input terminal 1 and the output data sequence from the delay elements $50_1$, $50_2$ and $50_3$ are supplied as address signals to the memory $51_1$. Similarly, the output data sequence from the delay elements $50_4$, $50_5$, $50_6$ and $50_7$ is supplied as an address signal to the memory $51_2$. Readout data signals from the memories $51_1$ and $51_2$ are supplied to the adders $52_1$ and $52_2$, and at the same time to the D/A converters $6_1$ and $6_2$, respectively. The digital signals supplied to the D/A converters $6_1$ and $6_2$ are converted to analog signals, respectively. These two analog signals are added by the analog adder 13. A sum signal from the analog adder 13 is supplied to the subtractor 7. It should be noted that the sum signal corresponds to the echo replica $ê(k)$ described with reference to FIG. 1.

Meanwhile, the output signal from the transmitter 3 is also supplied as an echo to the low-pass filter 10. The echo is caused by malfunction of the hybrid circuit 11, as previously described. A received signal transmitted from the serving switching center is also supplied to the low-pass filter 10 through the two-wire transmission line 12 and the hybrid circuit 11. Therefore, an output signal $u(k)$ from the low-pass filter 10 is expressed by equation (1) as previously described. Similarly, a signal $r(k)$ obtained by supplying the subtracted signal from the subtractor 7 and sampling this signal by means of the sample-and-hold circuit 8 can be expressed by equation (2) as previously described. The output signal from the sample-and-hold circuit 8 is supplied to the receiver 4 and the A/D converter 9. The receiver 4 comprises a Nyquist filter, a line equalizer, a buffer amplifier, a decoder and so on. The signal transmitted from the local switching center is received by the receiver 4 and appears as a binary code sequence at the output terminal 2. The output signal from the sample-and-hold circuit 8 is converted by the A/D converter 9 to a digital signal. This digital signal is then processed by the scaling circuit 53 in accordance with predetermined scaling. The scaled signal is supplied to the adders $52_1$ and $52_2$. The output signals from the adders $52_1$ and $52_2$ are then stored in the memories $51_1$ and $51_2$, respectively.

The memory $51_1$ performs an echo impulse response approximation for 0 to 3T seconds after the transmitted data is received at the input terminal 1, in accordance with the output signal as the error signal from the A/D converter 9. A signal produced as a part of the echo replica is supplied to the D/A converter $6_1$. Now assume that an echo path comprises a path of, the transmitter 3, the hybrid circuit 11, and the low-pass filter 10. Similarly, the memory $51_2$ performs an echo impulse response approximation for 4T to 7T seconds after the transmitted data is received at the input terminal 1, in accordance with the output signal as the error signal from the A/D converter 9. A signal produced as a part of the echo replica is supplied to the D/A converter $6_2$. Therefore, the echo replica for the entire interval of 7T seconds can be obtained.

In the echo canceler according to this embodiment, the echo impulse response approximation is optimally performed through adaptation at each transmitted data pattern corresponding to the length of the echo impulse response i.e., in FIG. 1 the impulse response in the path from the TRANSMITTER 3 to lowpass filter 10 via the hybrid 11. Therefore, the influence of nonlinear characteristics of the D/A converter can be substantially eliminated. In other words, the nonlinear characteristics of the D/A converter can be eliminated by the optimization algorithm (e.g., least mean squares) of the present invention.

The above-described advantage of the echo canceler of this embodiment will be described in detail for better understanding. For this purpose, a circuit arrangement is considered wherein the delay elements $50_4$ to $50_7$, the memory $51_2$, the D/A converter $6_2$, the adder $52_1$ and the adder 13 are excluded, and the output signal from the D/A converter $6_1$ is directly supplied to the inverting input terminal of the subtractor 7. The echo replica component for an interval of 3T seconds is obtained every time a 4-bit data array is supplied as an address signal to the memory $51_1$. The readout signal from the memory $51_1$ is converted by the D/A converter $6_1$ to an analog signal. A difference between the output signal from the D/A converter $6_1$ and the output signal from the low-pass filter 10 is obtained by the subtractor 7. The subtracted signal is supplied to the sample-and-hold circuit 8. The sampled signal is then supplied as the error signal to the A/D converter 9. The digital signal converted by the A/D converter 9 is then scaled by the scaling circuit 53. The scaled signal is then supplied to the adder $52_1$. The readout data from the memory $51_1$ is added to the output signal as the error signal from the adder $52_1$. A sum signal from the adder $52_1$ is stored in the memory $51_1$. The data stored at the predetermined address is updated, thereby completing optimization. In this manner, the optimum estimate is performed for every transmitted data pattern when the corresponding echo replica component is produced. Therefore, the nonlinear characteristics of the D/A converter $6_1$ can be absorbed by this operation. If an address of the memory $51_1$ comprises 8 bits, the memory $51_2$, the D/A converter $6_2$, the adder $52_1$ and the adder 13 may be omitted. However, in a practical system, the echo path impulse response time is as long as 8T to 16T. In this case, the address comprises 8 to 16 bits, so that the hardware scale is increased, resulting in inconvenience.

According to the present invention, the above drawback can also be eliminated in the following manner. The transmitted data sequence having a length corresponding to the echo impulse response time is divided into a plurality of groups. The transmission data of each group is supplied as an address signal to the corresponding memory. The readout data from each memory is converted by the correspoding D/A converter to an analog signal. The converted analog signals are added to obtain the echo replica. The difference {e(k)−ê(k)+s(k)+n(k)} between the echo replica e(k) and the signal received as the signal (echo signal e(k)+received signal s(k)+additive noise n(k)) passes through the sample-and-hold circuit, is converted by the A/D converter and then is scaled by the scaling circuit, thereby obtaining the digital error signal. A sum of the readout signal from each memory and the error signal is supplied as the input signal to the corresponding memory. As a result, the data stored in the memory can be updated. In other words, the data stored in the memory is updated so as to minimize the error signal. The digital readout data from each memory is converted to an analog signal which is then added to the error signal. Therefore, it is apparent from the above description that the nonlinear characteristics of the D/A converter are absorbed in the optimization process. For example, assume the echo path impulse response time is given as 15T seconds, and four memories are prepared wherein m-bit data (where m is a positive integer) is read out from each memory. Furthermore, assume that the number of address bits for each memory is 8 when the bits of the address data are equally divided therebetween. Under these conditions, a total memory capacity is $(2^4 \times m \times 4)$ bits. When the address data is not divided, the number of address bits is 16, so that a total memory capacity is $(2^{16} \times m)$ bits. Therefore, according to the present invention, the memory capacity can be reduced to $\frac{1}{10}$, thereby decreasing the hardware scale. In the first embodiment described with reference to FIG. 3, eight taps are used and the memory is divided into two groups. As may be apparent from the above description, the number of taps and the number of divided memory areas are not limited to the numbers given in the first embodiment.

In the first embodiment described with reference to FIG. 3, the readout data signals from the memories $51_1$ and $51_2$ are respectively supplied to the D/A converters $6_1$ and $6_2$. However, two sample-and-hold circuits may be used to receive an output signal from a single D/A converter. In other words, the single D/A converter may serve to perform time-division multiplexing. It will be readily understood by those skilled in the art that time-division multiplexing can also be applied if the number of memory divisions is increased.

Transmission data coding (transmitted onto the transmission line) which is not described in the first embodiment described with reference to FIG. 3 will now be described in detail hereinafter. The transmission data which is expressed by a binary code is converted to a code which is suitable for the transmission characteristics of the two-wire transmission line. The transmitter 3 shown in FIG. 3 performs encoding of the transmission data. In general, the code preferably does not have a DC component irrespective of probability characteristics of the input information. In this sense, the code is preferably a balanced code. A bipolar (AMI) code, a biphase code, a WAL 2 code and so on are known balanced codes. When the data transmission rate is given as 1/T bit/S, the AMI code requires a bandwidth of 1/T Hz; and the biphase and WAL2 codes require a bandwidth of 2/T Hz or wider. In order to handle the signal bandwidth, the sampling frequency of the sample-and-hold circuit 8, the A/D converter 9, and the D/A converters $6_1$ and $6_2$ is 2T Hz or 4/T Hz or higher. Along with this sampling frequency, the operating speed of the adders $52_1$ and $52_2$ and the memories $51_1$ and $51_2$ is 2T Hz or 4/T Hz or higher. The bipolar code comprises a +1 or −1 code corresponding to every binary "1". The adders $52_1$ and $52_2$ and the memories $51_1$ and $51_2$ must satisfy the bipolar code format.

Figure 4:
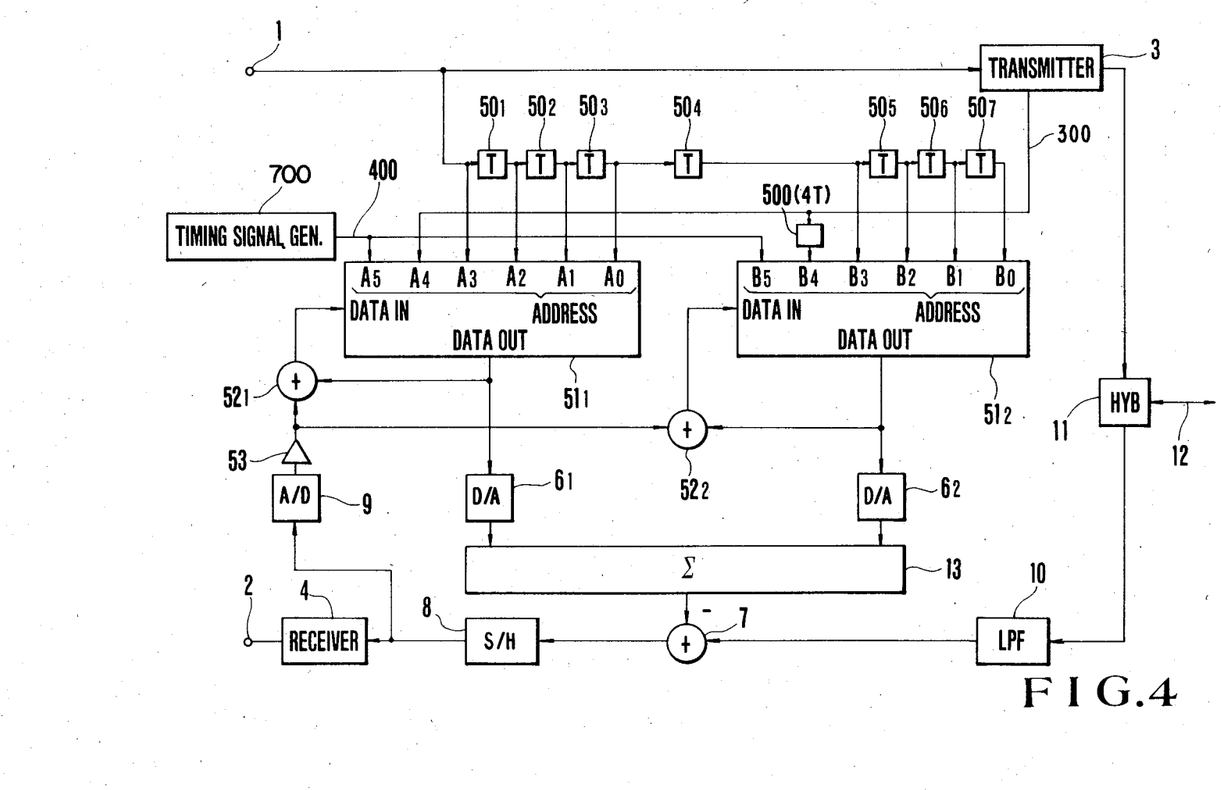
FIG. 4 is a block diagram of an echo canceler according to a second embodiment of the present invention.

FIG. 4 is a block diagram of an echo canceler according to a second embodiment of the present invention. The bipolar code is used as the transmission line code.

The echo canceler of the second embodiment differs from that of the first embodiment as follows. First, a timing signal 400 as an output signal from a timing generator 700 is supplied as an address signal to memories $51_1$ and $52_2$. Second, a sign designation signal 300 which indicates the sign of binary "1" in the unipolar-to-bipolar conversion of a transmitter 3 is supplied as an address signal to the memory $51_1$, and also through a 4T-delay element 500 to the memory $51_2$.

Figure 5:
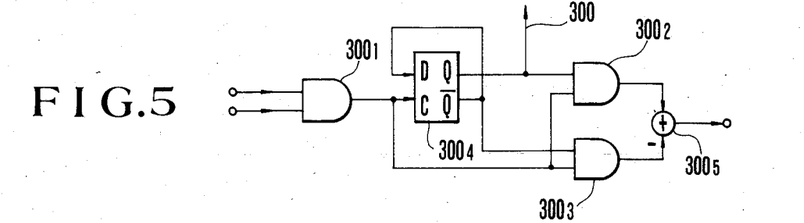
FIG. 5 is a detailed block diagram of a transmitter shown in FIG. 4.
Figures 6A, 6E:
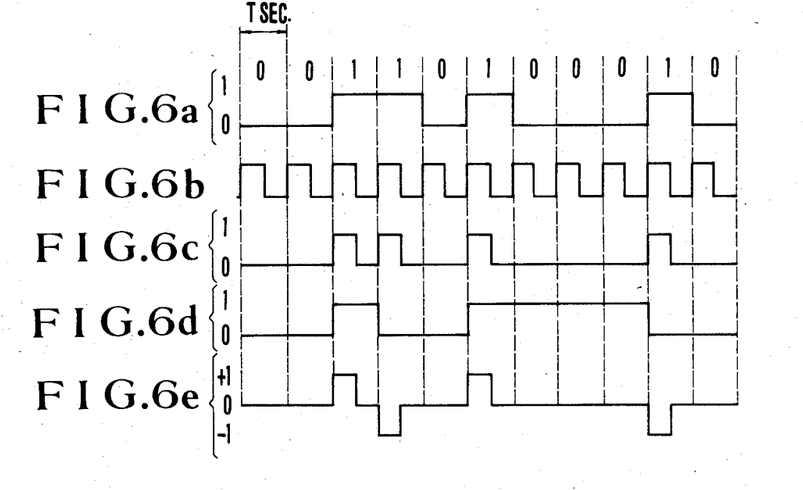

The transmitter 3, the sign designation bit 300, and the delay element 500 shown in FIG. 4 will be described hereinafter. FIG. 5 is a block diagram of the transmitter 3. Referring to FIG. 5, reference numerals $300_1$, $300_2$ and $300_3$ denote AND gates; $300_4$, a D flip-flop; and $300_5$, a subtractor. A Q output 300 from the flip-flop $300_4$ corresponds to the sign designation signal designated by the same reference numeral. The operation of the transmitter 3 shown in FIG. 5 will be described with reference to the timing charts in FIGS. 6(a) to 6(e). The AND gate $300_1$ receives the transmitted data (FIG. 6(a)) having a transmission rate of 1/T bits/second and a clock (FIG. 6(b)). The waveform of an output signal from the AND gate $300_1$ is shown in FIG. 6(c). When the output signal from the AND gate $300_1$ is supplied as a clock to the flip-flop $300_4$, the flip-flop $300_4$ produces the Q output, the waveform of which is shown in FIG. 6(d). The $\overline{Q}$ output from the flip-flop $300_4$ is the one obtained by inverting the Q output (FIG. 6(d)). The signal (FIG. 6(c)) and the Q output from the flip-flop $300_4$ are supplied to the AND gate $300_2$. The signal (FIG. 6(c)) and the $\overline{Q}$ output from the flip-flop $300_4$ are supplied to the AND gate $300_3$. Output signals from the AND gates $300_2$ and $300_3$ are supplied to the subtractor $300_5$. The subtractor $300_5$ produces a bipolar code signal, the waveform of which is shown in FIG. 6(e). As may be apparent from a comparison between the signals shown in FIGS. 6(d) and 6(e), the binary "1" and the binary "0" in the waveform of the signal shown in FIG. 6(d) correspond to $+1$ and $-1$ of the code in FIG. 6(e), respectively. Therefore, the signal shown in FIG. 6(d) is regarded as the sign designation signal. It should be noted that the sign designation signal is meaningless when the transmitted signal is set at binary "0". As may be apparent from FIGS. 5 and 6, when the transmitted signal is continuously set at binary "1", the sign designation signal 300 changes every T seconds. The sign designation signal 300 in FIG. 4 is supplied as an address signal for the address bit $A_4$ of the memory $51_1$ and is supplied as an address signal for the address bit $B_4$ of the memory $51_2$ through the delay element 500. For the time being, assume that the address bits $A_5$ and $B_5$ of the memories $51_1$ and $51_2$ are neglected. The relation given below will be described.

| $A_4$ | $A_3$ | $A_2$ | $A_1$ | $A_0$ |
|---|---|---|---|---|
| | | For $A_4=$ "1" | | |
| 1 | 1 | 0 | 1 | 0 |
| | V | | V | |
| | $+1$ | | $-1$ | |
| | | For $A_4=$ "0" | | |
| 0 | 1 | 0 | 1 | 0 |
| | V | | V | |
| | $-1$ | | $+1$ | |

As may be apparent from the relation, even if the address bits $A_0$ to $A_3$ for $A_4=$ "1" are the same as those for $A_4=$ "0", these cases must be clearly distinguished since unipolar-to-bipolar conversion differs in accordance with the binary values of the sign designation signal. According to the present invention, if $A_4$ is added as the address bit, so that the address bits $A_0$ to $A_3$ have the same pattern in these cases, the corresponding memory cell can be selected in accordance with the address bit $A_4$. If $A_0=A_1=A_2=A_3=$ "0", the binary value of the address bit $A_4$ need not be distinguished. In this case, the address bit $A_4$ is set at the inhibit mode. It is, of course, apparent that identification of the binary value of the address bit $A_4$ may not affect normal operation. Similarly, this may be applied to the address bit $B_4$ of the memory $51_2$. The address bit $B_4$ is set by delaying the sign designation signal 300 by 4T seconds (four bits). The delay time corresponds to the number of bits of the data array transmitted as the address signal to the memory $51_1$ (i.e., the 4-bit data for each of the address bits $A_0$ to $A_4$). The above-mentioned description has been made on the basis that the bipolar code is used as the transmission line code. However, if a code which depends on a plurality of preceding samples is used as the transmission line code, a control signal is supplied as address signals to the memories $51_1$ and $51_2$ in accordance with the code conversion rules. The additional address bit $A_4$ or $B_4$ may comprise a plurality of bits.

Figures 7A, 7B:
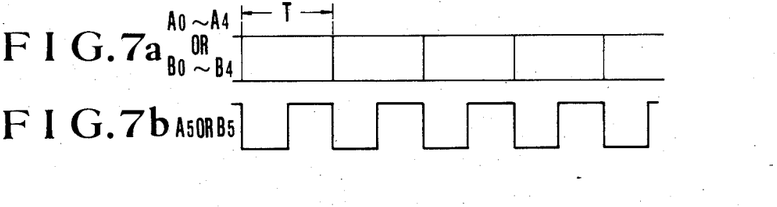
FIGS. 7(a) and 7(b) are timing charts of address signals for memories $600_1$ and $600_2$ shown in FIG. 4.

The timing signal 400 from the timing generator 700 shown in FIG. 4 will be described. The timing signal 400 is used to cause the echo canceler to operate at a speed corresponding to an integer multiple of the data transmission/reception rate, thereby canceling echoes of the transmission line code having a power spectrum extending to a high-frequency bandwidth. In the second embodiment described with reference to FIG. 4, the bipolar code is used as the transmission line code, so that the power spectrum thereof is regarded as a 1/T Hz bandwidth. Therefore, the operating speed of the echo canceler must be twice the data transmission/reception rate, i.e., 2/T-Hz sampling frequency. Referring to FIG. 4, the address bits $A_0$ to $A_4$ and $B_0$ to $B_4$ of the address signals respectively supplied to the memories $51_1$ and $51_2$ change every T seconds, and the address bits $A_5$ and $B_5$ change every T/2 seconds. The timing charts of these two types of address bits are illustrated in FIGS. 7(a) and 7(b). In particular, FIG. 7(a) shows the timing chart of the address bits $A_0$ to $A_4$ or $B_0$ to $B_4$. The logic level of the bits changes every T seconds in accordance with to the data transmission/reception rate. On the other hand, FIG. 7(b) shows the timing chart of the address bit $A_5$ or $B_5$. The logic level of this bit changes every T/2 seconds with the timing signal 400 generated from the timing generator 700. With this arrangement, it is possible to set a sampling frequency of 2/T Hz for D/A converters $6_1$ and $6_2$, a sample-and-hold circuit 8, an A/D converter 9, a scaling circuit 53, adders $52_1$ and $52_2$, and the memories $51_1$ and $51_2$. As a result, echoes up to the bandwidth of 1/T Hz can be cancelled. In the second embodiment of the present invention in FIG. 4, the operating speed of the echo canceler is assumed to be double the data transmission/reception rate. When the number of additional address bits is increased corresponding to the ratio of the operating speed to the data transmission/reception rate, the echo canceler can be operated at a speed corresponding to an integer multiple of the data transmission/reception rate (bit rate).

In the second embodiment of FIG. 4, two memories are used. However, a plurality of memories greater than two as described in reference to as shown in FIG. 3 may be used. Furthermore, as described with reference to FIG. 3, time-division multiplexing of the D/A converter may also be performed in the echo canceler in FIG. 4.

According to the first and second embodiments of the present invention, there are provided echo cancelers wherein the degradation of nonlinear characteristics of the D/A converter can be eliminated, and fine adjustment thereof need not be performed. Furthermore, random access memories are used, so that a compact LSI echo canceler can be easily obtained.

Figure 8:
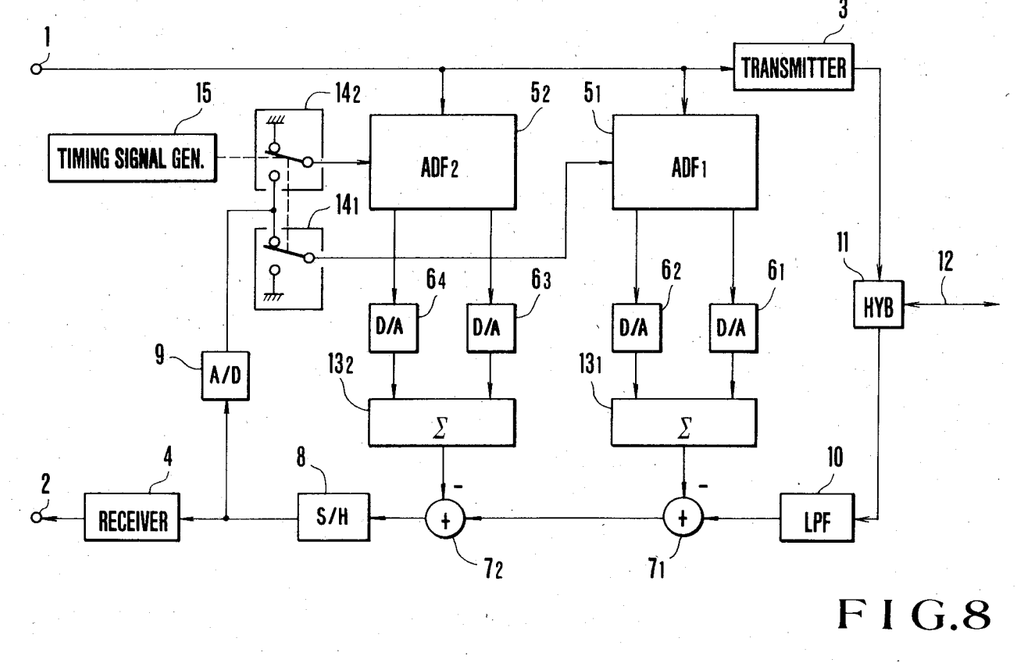
FIGS. 8 to 10 are block diagrams of echo cancelers using alternate forms of the adaptive digital filter shown in FIG. 3 according to third to fifth embodiments of the present invention.
Figure 9:
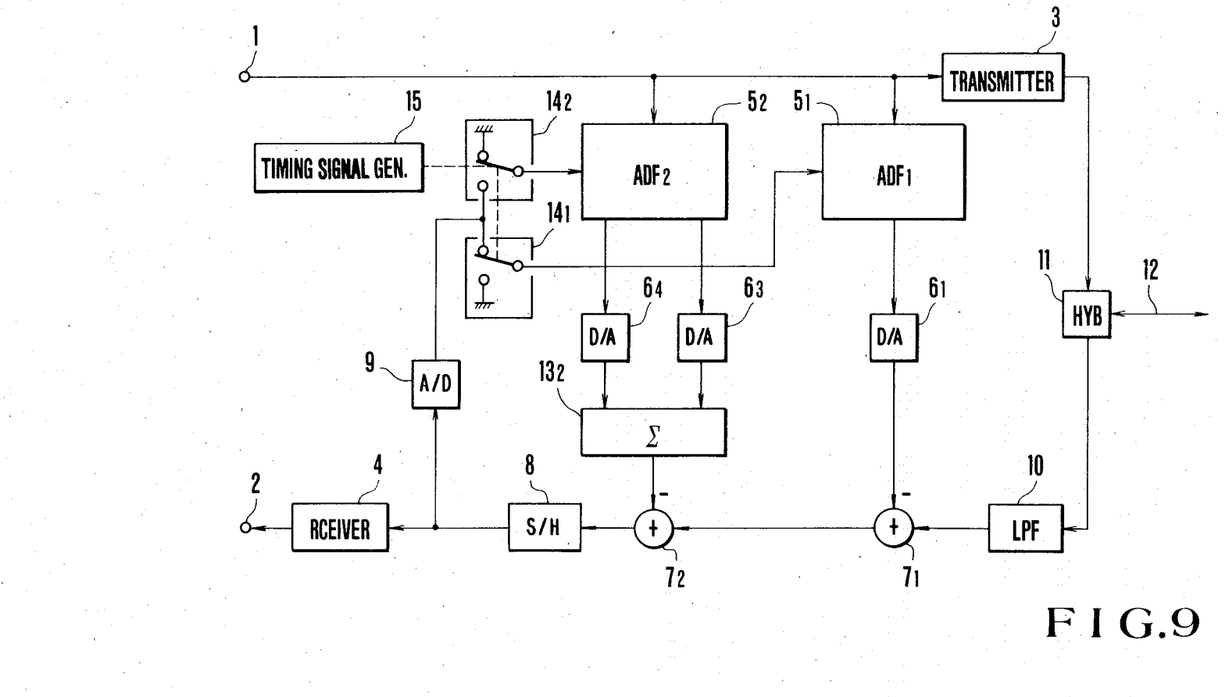
Figure 10:
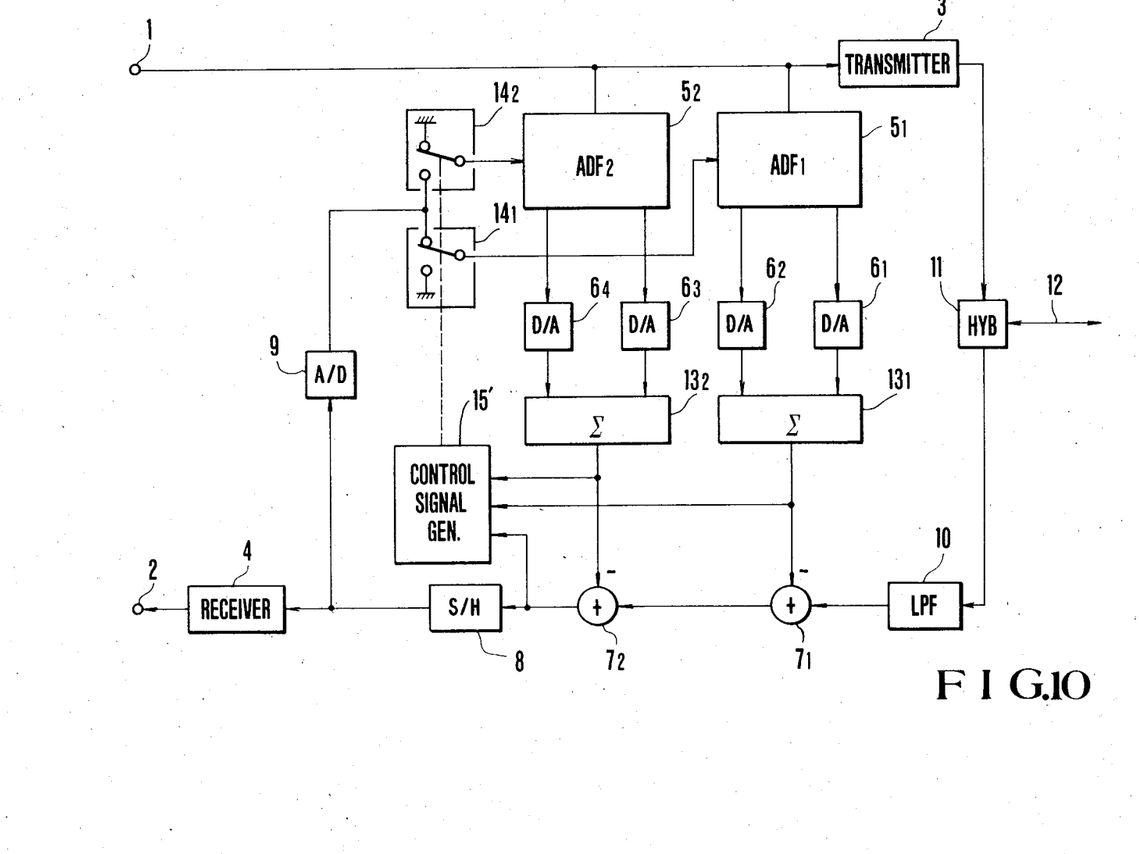

FIGS. 8 to 10 are block diagrams of echo cancelers according to third to fifth embodiments of the present invention. These echo cancelers are obtained by improving the echo cancelers of the first and second embodiments so as to decrease the bit conversion capacity of the D/A converter, thereby readily providing a compact LSI echo canceler. Referring to FIG. 8, reference numerals 1 and 2 denote input and output terminals, respectively; 3, a transmitter; 4, a receiver; $5_1$ and $5_2$, adaptive digital filters, respectively; $6_1$, $6_2$, $6_3$ and $6_4$, D/A converters (DAC), respectively; $7_1$ and $7_2$, subtractors, respectively; 8, a sample-and-hold circuit (SH); 9, an A/D converter (ADC); 10, a low-pass filter (LPF); 11, a hybrid circuit (HYB); 12, a two-wire transmission line; $13_1$ and $13_2$, analog adders, respectively; $14_1$ and $14_2$, switches, respectively; and 15, a timing generator.

The adaptive digital filters $5_1$ and $5_2$ shown in FIG. 8 are substantially the same as that shown in FIG. 3. The converging operation of this echo canceler is performed in a two-step manner. In the first step, echo signals are roughly cancelled. In the second step, the echo signals which have not been cancelled so far, that is, residual echoes, are cancelled. The adaptive digital filter $5_1$ performs convergence in the first step, and the adaptive digital filter $5_2$ performs convergence in the second step.

When the echo canceler shown in FIG. 8 starts the convergence operation, the timing generator 15 generates a control signal indicated by the dotted line. The switches $14_1$ and $14_2$ are set at positions in FIG. 8, respectively. An output signal from the A/D converter 9 is supplied to the adaptive digital filter $5_1$ through the switch $14_1$. A signal of zero level is supplied from the switch $14_2$ to the adaptive digital filter $5_2$. Since the switches $14_1$ and $14_2$ are set in the first step at the positions as shown in FIG. 8, the adaptive digital filter $5_1$ is activated, but the adaptive digital filter $5_2$ is kept deactivated. Therefore, an echo replica appears at the output terminal of the adder $13_1$, but no output signal appears at the output terminal of the adder $13_2$. It should be noted the adaptive digital filters $5_1$ and $5_2$ are cleared before the first-step convergence is started.

When a predetermined time interval has elapsed after the start of the first-step convergence, the second-step convergence is started. In response to the control signal from the timing generator 15, the switching positions of the switches $14_1$ and $14_2$ are reversed. More particularly, the output signal from the A/D converter 9 is supplied to the adaptive digital filter $5_2$ through the switch $14_2$. A signal of low level is supplied from the switch $14_1$ to the adaptive digital filter $5_1$. Although the adaptive operation of the adaptive digital filter $5_1$ is stopped, the storage therein is read out, and the echo replica depending upon the received data at the input terminal 1 is produced and appears at the output terminal of the adder $13_1$.

Meanwhile, when the converging operation in the second step is started, the adaptive digital filter $5_2$ is started to perform adaptive control operation. In particular, the adaptive digital filter $5_2$ is operated to decrease the residual echoes appearing at the output terminal of the subtractor $7_1$. It is here apparent that the input bit number of the D/A converters $6_1$ and $6_2$ can be decreased since they only produce an echo replica of low precision. Furthermore, the D/A converters $6_3$ and $6_4$ involving the adaptive control operation in the second step converts digital signals having a narrow dynamic range. Therefore, the bit number of the D/A converters $6_3$ and $6_4$ can also be decreased. For example, the bit number of the D/A converter can be decreased to about 7 to 8 bits to obtain the same residual echo level as the conventional structure as shown in FIG. 1 which requires a 12-bit D/A converter. In this case, the m-bit number of each of the D/A converters $6_1$ and $6_2$ is preferably equal to the n-bit number of each of the D/A converters $6_3$ and $6_4$. However, the condition m=n need not be satisfied.

Furthermore, the quantizing noise component generated by the D/A converters $6_1$ and $6_2$ can be eliminated by the adaptation process in the second step. This is because each echo replica is produced for every subpattern obtained by dividing the pattern of data supplied by the adaptive digital filter $5_2$, each echo replica is converted by the D/A converter, and the echo replicas for a desired interval are added together.

The receiver 4 shown in FIG. 8 has a transmission loss compensation function. However, it is possible to insert part or all the function between the subtractors $7_1$ and $7_2$. In this case, it is expected that the tap length of the adaptive digital filter $5_2$ be shortened. Alternatively, this function may be inserted between the low-pass filter 10 and the subtractor $7_1$. Each of the adaptive digital filters $5_1$ and $5_2$ is divided into two in this embodiment. However, in general, $M_1$ and $M_2$ divisions (where $M_1$, $M_2 = 1, 2, 3 \ldots$) can be achieved.

FIG. 9 is a block diagram of an echo canceler according to a fourth embodiment of the present invention. The echo canceler of this embodiment is substantially the same as that of the third embodiment (FIG. 8) except for the arrangement of the adaptive digital filter $5_1$. The adaptive digital filter $5_1$ shown in FIG. 8 is the same as that shown in FIG. 3. However, an adaptive digital filter $5_1$ shown in FIG. 9 is the same as that shown in FIGS. 1 and 2. For this reason, the D/A converter $6_2$ and the adder $13_1$ shown in FIG. 8 are omitted in FIG. 9. Otherwise, the arrangement of the fourth embodiment is substantially the same as that of the third embodiment.

The operation of the echo canceler shown in FIG. 9 is the same as that shown in FIG. 8. The convergence operation is performed in a two-step manner. The adaptive digital filter $5_1$ performs first-step convergence and an adaptive digital filter $5_2$ performs second-step convergence in the same manner as in the echo canceler shown in FIG. 8. The convergence in the first step changes to that in the second step by switching switches $14_1$ and $14_2$ in accordance with control signals from a timing generator 15. It is apparent that the bit number of D/A converters $6_1$, $6_3$ and $6_4$ can be decreased for the same reason as applied in the echo canceler shown in FIG. 8. A transmission line loss compensation function, included in a receiver 4, may be inserted between subtractors $7_1$ and $7_2$, or inserted between a low-pass filter 10 and the subtractor $7_1$. The adaptive digital filter $5_2$ in FIG. 9 is divided into two in this embodiment. However, in general, M divisions can be performed (where M is 1, 2, 3, ... ). In the third and fourth embodiments, a single D/A converter may be used in place of the plurality of D/A converters by utilizing time-division multiplexing technique.

FIG. 10 is a block diagram of an echo canceler according to a fifth embodiment of the present invention. The same reference numerals as used in FIG. 8 denote the same functions in FIG. 10. The echo canceler shown in FIG. 10 is substantially the same as that shown in FIG. 8, except that the timing generator 15 is replaced with a control signal generator 15'. Referring to FIG. 10, the control signal generator 15' receives output signals from adders $13_1$ and $13_2$ and a sample-and-hold circuit 8. The control signal generator 15' then estimates a residual echo level and generates control signals in accordance with the estimated level. The control signals are then supplied to the switches $14_1$ and $14_2$, thereby switching the step modes of the echo canceler. In the echo canceler shown in FIG. 8, the first-step convergence is switched to the second-step convergence after a predetermined time interval has elapsed. However, in the echo canceler shown in FIG. 10, the switching operation is performed in accordance with the residual echo level.

The control signal generator 15' estimates the residual echo level in the following manner. When the residual echo level is larger than a convergence value determined by the gain factor of the echo canceler and the bit number of the D/A converter, each code of the echo replica has a correlation with a code of the residual echo. However, when the residual echo level comes close to the convergence value, the above-mentioned codes do not have a correlation. As a result, the residual echo level can be estimated in accordance with the correlation between the codes of the echo replica and the convergence value. Alternatively, by monitoring a change in the contents of the memory of the adaptive digital filter, the residual echo level can be estimated. Excluding the above points, the echo canceler shown in FIG. 10 can be regarded to be equivalent to that shown in FIG. 8.

For the sake of simplicity, two adaptive digital filters are used in each of the echo cancelers shown in FIGS. 8, 9 and 10. However, the number of adaptive digital filters is not limited to two, but may be extended to more than two.

In fine, the required bit number of the D/A converter is decreased, so that a compact LSI echo canceler can be easily obtained.

The present invention is not limited to the particular embodiments described above. Various changes and modifications may be made within the spirit and scope of the present invention.

What is claimed is:

1. An echo canceler for canceling an echo as a leakage component to a four-wire receiving end in a two-wire/four-wire conversion hybrid circuit when a transmitted signal is sent from a four-wire line to a two-wire line, comprising:

transmitting means for receiving a transmitted binary data sequence having a predetermined interval therebetween, converting the transmitted binary data sequence to a given coded signal including sign designation signals, and producing the given coded signal and sign designation signals at an output;

an adaptive digital filter including a plurality of delay elements for receiving the transmitted binary data sequence, delaying the transmitted binary data sequence by one sampling interval so as to obtain delayed data sequences, and dividing the delayed data sequences into a plurality of groups of signal components, the groups of signal components being produced as address signals, respectively, and a plurality of memories respectively having memory cells the storage contents of which are read out in response to the address signals from said delay elements and sign designation signals such that a first memory among said plurality of memories directly receives the sign designation signal, and 2nd through Nth (n is 2, 3, 4, ... ) memories among said plurality of memories respectively receive the sign designation signals through delay lines so that the Nth memory receives the sign designation signal delayed by a time interval corresponding to delay time of an (N−1)th delay element among said plurality of delay elements, the number of said memories being equal to that of the plurality of groups of signal components;

a timing signal generator for generating additional address signals to said plurality of memories;

a plurality of D/A converters for converting readout digital signals from said plurality of memories to analog signals, respectively;

an analog adder for adding all the analog signals from said plurality of D/A converters to produce an echo replica;

a hybrid circuit for receiving the coded signal from said transmitting means, and a received signal, including additive noise, from said two-wire line, the coded signal being reproduced as said echo signal;

a low-pass filter for receiving the echo signal, the received signal including the additive noise and for eliminating a high frequency signal component therefrom;

a subtractor for receiving a filtered signal from said low-pass filter and the echo replica from said analog adder and for subtracting the echo replica from the filtered signal so as to produce an error signal;

a sample-and-hold circuit for receiving said error signal and for producing a sampled signal;

an A/D converter for receiving the sampled signal from said sample-and-hold circuit and for producing a digital signal; and receiving means for receiving and decoding the sampled signal and for sending a decoded signal therefrom, said adaptive digital filter further including a plurality of 2-input adders, each of which receives a signal from said A/D converter and one of the digital signals read out from said plurality of memories, the number of said 2-input adders being equal to that of said memories, and sum signals from said 2-input adders being stored in said memories, respectively.

2. An echo canceler according to claim 1, wherein said adaptive digital filter further includes:

a scaling circuit for processing the digital signal from said A/D converter in accordance with predetermined scaling.

3. An echo canceler for canceling an echo as a leakage component to a four-wire receiving end in a two-wire/four-wire conversion hybrid circuit when a transmitted signal is sent from a four-wire line to a two-wire line, comprising:

a plurality of adaptive digital filters, each of which comprises:
  a plurality of delay elements for receiving a transmitted binary data sequence, delaying the transmitted binary data sequence by one sampling interval so as to obtain delayed data sequences, and dividing the delayed data sequences into a plurality of groups of signal components, the groups of signal components being produced as address signals, respectively,
  a plurality of memories respectively having memory cells the storage contents of which are read out in response to the address signals, the number of said memories being equal that that of the plurality of groups of signal components,
  a scaling circuit for performing predetermined scaling, and
  a plurality of 2-input adders, each of which receives a scaled signal from said scaling circuit and one of the digital signals read out from said plurality of memories, the number of said 2-input adders being equal to that of said memories, and sum signals from said 2-input adders being stored in said memories, respectively;
a plurality of switching means respectively connected to said plurality of adaptive digital filters so as to sequentially cause said plurality of adaptive digital filters to perform a convergence operation;
a timing generator for supplying a control signal to said plurality of switching means, so that a first adaptive digital filter among said plurality of adaptive digital filters partially cancels the echo, and an ith (i=2, 3, ...) adaptive digital filter cancels a residual echo which is left uncanceled by the first to (i−1)th adaptive digital filters; and
a plurairty of D/A converters respectively corresponding to said memories so as to sequentially receive and convert the readout digital signals to analog signals.

4. An echo canceler according to claim 3, further including:
  transmitting means for receiving the transmitted binary data sequence, converting the transmitted binary data sequence to a given coded signal, and producing the given coded signal at an output;
  an analog adder for adding all the analog signals from said plurality of D/A converters to produce an echo replica;
  a hybrid circuit for receiving the coded signal from said transmitting means, and a received signal, including additive noise, from said two-wire line, the coded signal being reproduced as said echo signal;
  a low-pass filter for receiving the echo signal, the received signal including the additive noise and for eliminating a high frequency signal component therefrom;
  a subtractor for receiving a filtered signal from said low-pass filter and the echo replica from said analog adder and for subtracting the echo replica from the filtered signal so as to produce an error signal;
  a sample-and-hold circuit for receiving the error signal and for producing a sampled signal;
  an A/D converter for receiving the sampled signal from said sample-and-hold circuit and for producing a digital signal to be supplied to said scaling circuit; and
  receiving means for receiving and decoding the sampled signal and for sending a decoded signal therefrom.

5. An echo canceler according to claims 3 or 4, wherein said timing generator comprises a control signal generator for receiving the error replica from said analog adder, and the error signal from said subtractor and for generating a control signal to said plurality of switching means.

6. An echo canceler for canceling an echo as a leakage component to a four-wire receiving end in a two-wire/four-wire conversion hybrid circuit when a transmitted signal is sent from a four-wire line to a two-wire line, comprising:

a plurality of adaptive digital filters including a first adaptive digital filter and a second adaptive filter operable to perform a two-step convergence operation,
said first adaptive digital filter having a plurality of delay elements, each of which receives a transmitted signal such that a first delay element among said pluraity of delay elements receives the transmitted signal, and an ith (i=2, 3, 4, ...) delay element thereamong receives the transmitted signal delayed by a predetermined time interval from an (i−1)th delay element thereamong,
a plurality of coefficient signal generating means, each of which receives an error signal and the transmitted signal such that the first coefficient signal generating means among said plurality of coefficient signal generating means directly receives the transmitted signal and ith (i=2, 3, 4, ...) coefficient signal generating means thereamong receives the delayed signal from said (i−1) delay element, said plurality of coefficient signal generating means respectively producing predetermined coefficient signals in accordance with the corresponding transmitted signal and the error signal,
a plurality of multipliers, each of which receives a corresponding one of the coefficient signals and the transmitted signal such that a first multiplier among said pluraity of multipliers directly receives the transmitted signal and an ith multiplier thereamong receives the delayed transmitted signal from said (i−1)th delay element, and
a first adder for adding outputs from said plurality of multipliers so as to produce an echo replica, and
said second adaptive digital filter having
a plurality of delay elements for receiving the transmitted binary data sequence, delaying the transmitted binary data sequence by one sampling interval so as to obtain a delayed data sequence, and dividing the delayed data sequence into a plurality of groups of signal components, the groups of signal components being supplied as address signals, respectively,
a plurality of memories respectively having memory cells the storage contents of which are read out in response to the address signals, the number of said memories being equal to that of the plurality of groups of signal components,
a scaling circuit for performing predetermined scaling, and
a plurality of 2-input adders, each of which receives a scaled signal from said scaling circuit and one of the readout digital signals from said plurality of memories, the number of said 2-input adders being equal to that of said memories, and sum signals from said 2-input adders being stored in said memories, respectively;

a plurality of D/A converters, said first adaptive digital filter coupled to a single D/A converter among said plurality of D/A converters, and said second adaptive digital filter coupled to said D/A converters which number the same as said memories;

a plurality of subtractors respectively corresponding to said plurality of adaptive digital filters, an output from said single D/A converter being directly supplied to a corresponding subtractor among said plurality of subtractors; and at least one second adder corresponding to said second adaptive digital filter;

a plurality of switching means respectively connected to said plurality of adaptive digital filters so as to sequentially cause said plurality of adaptive digital filters to perform said convergence operation; and a timing generator for supplying a control signal to said plurality of switching means, so that a first adaptive digital filter among said plurality of adaptive digital filters partially cancels the echo, and an ith ($i=2, 3, \ldots$) adaptive digital filter thereamong cancels a residual echo which is left uncanceled by the first to ($i-1$) the adaptive digital filters.

7. An echo canceler according to claim 6 further comprising:

transmitting means for receiving the transmitted binary data sequence, converting the transmitted binary data sequence to a given coded signal, and producing the given coded signal at an output;

a hybrid circuit for receiving the coded signal from said transmitting means, and a received signal, including additive noise, from said two-wire line, the coded signal being reproduced as said echo signal;

a low-pass filter for receiving the echo signal, the received signal including the additive noise and for eliminating a high frequency signal component;

an A/D converter for receiving the sampled signal from said sample-and-hold circuit and for producing a digital signal to be supplied to said scaling circuit; and receiving means for receiving and decoding the sampled signal and for sending a decoded signal therefrom.

* * * * *